(12) United States Patent
Park et al.

(10) Patent No.: US 8,932,768 B2
(45) Date of Patent: Jan. 13, 2015

(54) CATHODE MATERIAL FOR LITHIUM BATTERIES

(71) Applicant: UChicago Argonne, LLC, Chicago, IL (US)

(72) Inventors: Sang-Ho Park, Woodridge, IL (US); Khalil Amine, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/863,955

(22) Filed: Apr. 16, 2013

(65) Prior Publication Data

US 2013/0230780 A1    Sep. 5, 2013

Related U.S. Application Data

(62) Division of application No. 11/455,358, filed on Jun. 19, 2006, now Pat. No. 8,492,030.

(51) Int. Cl.
| | |
|---|---|
| *H01M 4/131* | (2010.01) |
| *H01M 10/0525* | (2010.01) |
| *H01M 10/056* | (2010.01) |
| *C01G 45/00* | (2006.01) |
| *C01G 45/12* | (2006.01) |
| *C01G 51/00* | (2006.01) |
| *C01G 53/00* | (2006.01) |
| *H01M 4/485* | (2010.01) |
| *H01M 4/505* | (2010.01) |
| *H01M 4/525* | (2010.01) |
| *H01M 10/0568* | (2010.01) |
| *H01M 10/0569* | (2010.01) |
| *H01M 10/052* | (2010.01) |

(52) U.S. Cl.
CPC ............. *H01M 4/131* (2013.01); *C01G 45/006* (2013.01); *C01G 45/1228* (2013.01); *C01G 51/006* (2013.01); *C01G 51/50* (2013.01); *C01G 53/006* (2013.01); *C01G 53/50* (2013.01); *H01M 4/485* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 10/056* (2013.01); *C01P 2002/52* (2013.01); *C01P 2002/72* (2013.01); *C01P 2002/77* (2013.01); *C01P 2004/03* (2013.01); *C01P 2004/32* (2013.01); *C01P 2004/61* (2013.01); *C01P 2006/11* (2013.01); *C01P 2006/40* (2013.01); *H01M 10/052* (2013.01); *Y02E 60/122* (2013.01); *Y02T 10/7011* (2013.01)
USPC ........ 429/331; 429/231.1; 429/223; 429/188; 429/199; 429/200; 429/338; 429/342; 429/341

(58) Field of Classification Search
USPC .............. 429/188, 199, 200, 223, 123.1, 331, 429/338, 341, 342
See application file for complete search history.

(56) References Cited

U.S. PATENT DOCUMENTS 7,435,510 B2 * 10/2008 Tode et al. ................. 429/231.3
2004/0202937 A1  10/2004 Barker et al.

(Continued)

*Primary Examiner* — Karie O'Neill Apicella
(74) *Attorney, Agent, or Firm* — Foley & Lardner LLP

(57) ABSTRACT

A method of manufacture an article of a cathode (positive electrode) material for lithium batteries. The cathode material is a lithium molybdenum composite transition metal oxide material and is prepared by mixing in a solid state an intermediate molybdenum composite transition metal oxide and a lithium source. The mixture is thermally treated to obtain the lithium molybdenum composite transition metal oxide cathode material.

17 Claims, 3 Drawing Sheets

(56) References Cited

U.S. PATENT DOCUMENTS

2005/0058588 A1\* 3/2005 Kang et al. ................ 423/420.2
2006/0105241 A1 5/2006 Tode et al.

\* cited by examiner

CATHODE MATERIAL FOR LITHIUM BATTERIES

CROSS-REFERENCE TO RELATED PATENT APPLICATIONS

This application is a divisional application and claims priority to U.S. patent application Ser. No. 11/455,358; filed on Jun. 19, 2006, and incorporated herein by reference in its entirety.

The United States Government has certain rights in the invention pursuant to Contract No. W-31-109-ENG-38 between the U.S. Department of Energy and fee University of Chicago operating Argonne National Laboratory.

BACKGROUND OF THE INVENTION

The present invention relates generally to a method for producing a cathode material for lithium batteries. More particularly the invention relates to a metal composite oxide, and to a method for producing a composite lithium transition metal oxide for use as an active positive electrode material for lithium secondary batteries.

Secondary batteries are used as a power source for IT electronic devices, such as PDAs, cellular phones, notebook computers, electric bicycles, electric vehicle (EV), hybrid electric vehicle (HEV) and the like. Therefore, there is a growing demand for secondary batteries capable of repeated charges and discharges. In particular, since the performance of these devices depends on the secondary batteries, in particular, high performance secondary batteries are required. Thus the characteristics required for such secondary batteries include excellent charge-discharge characteristics, long life characteristics, high-rate characteristics, thermal stability at high temperatures and the like. In addition, lithium secondary batteries have been drawing attention in terms of use in high voltage and high energy density applications.

Lithium secondary batteries are classified into lithium batteries that use lithium metal as a negative electrode and lithium ion batteries that use carbon negative electrodes that are capable of intercalating/deintercalating lithium ions as an interlayered compound. Furthermore, lithium secondary batteries are often classified by the type of electrolyte used; and they include such as I the following: liquid type batteries, gel type polymer batteries and solid state type polymer batteries.

In typical lithium-ion secondary batteries, $LiCoO_2$ is used as the positive electrode material and graphite is used as the negative electrode material. Positive electrode materials that have been researched and developed hitherto include $LiNiO_2$, $LiCo_xNi_{1-x}O_2$, $LiMn_2O_4$, and other conventional lithium compounds known in the art. $LiCoO_2$ is excellent in terms of stable charge-discharge characteristics and excellent discharge voltage characteristics. However, a cell which uses these materials has disadvantages in that cobalt (Co) is not readily available as a raw material and is thus expensive. In addition, Co has an environmental toxicity factor. Since $LiNiO_2$ is difficult to synthesize and has poor thermal stability, it has not been widely used. Moreover, $LiMn_2O_4$ spinel is the most widely used positive electrode material due to its relatively low cost and its ease of synthesis. However, a spinel type of $LiMn_2O_4$ electrode for 4V grade secondary batteries has a serious problem in that its theoretical discharge capacity is only about 148 mAh/g, which is much lower in energy density than the other positive Li-ion electrode materials.

Thus, there is a need for a composite oxide positive electrode material having a layered crystal structure and capable of solving various problems including the above recited problems, and at the same time, maintain the advantages of the Co, Ni, Mn oxides. As a measure of potential performance, one equivalent amount of lithium present in a composite oxide having a layered crystal structure can participate in the charge and discharge state, the composite oxide has a theoretical capacity of 285 mAh/g. It is therefore desirable to overcome the above-stated problems and achieve the optimum battery capacity.

SUMMARY OF INVENTION

The present invention provides cathode materials with higher tap densities for use in lithium secondary batteries. These higher tap densities allow one to obtain higher specific energy densities for the lithium cells, as well as excellent cycle life performance and low area specific impedance. A method is also provided for preparing a mixed transition metal composite oxide for use as a positive electrode active material for lithium secondary batteries. The steps comprising the preparation of the composite oxide include: a transition metal carbonate precursor that is pre-calcined to obtain an intermediate composite oxide powder with a high tap density; next a molybdenum sintering agents and a lithium source are added and blended into the mixture; the intermediate lithium sources are mixed in the solid state, followed by thermally treating the mixture; and this treatment is performed in the temperature range of about 600~1000° C. The present invention therefore provides cathode materials for use in lithium secondary batteries, a process for producing the materials, and lithium secondary batteries.

Cathode materials are also provided for use in lithium secondary batteries as described above, wherein an average particle size of approximately 10 micrometers with a spherical morphology, and a tap density of the cathode materials of over 1.9 g/ml. The cathode material participates in the cell which consist of a cathode a lithium conducting electrolyte and an anode, through a chemical reaction by lithium intercalation/deintercalation. During this process the added elements which do not fracture or break the original structure of cathode material, and thus excellent electrochemical properties are obtained.

The process for producing cathode materials for use in lithium secondary batteries includes a calcination process at over 600° in a furnace. The process is preferably carried out by using a box furnace for uniform heating. The preferred process also includes producing cathode materials for use in lithium secondary batteries, wherein the Mo: containing material compound comprising $MoO_3$, and LiF is molten on the surface of the particles of Li—Ni—Co—Mn composite oxide so as to carry out the above described calcination process in the box furnace. Additional molybdenum can be provided to the lithium composite oxide produced by the methods of this invention.

The above aspects and other objects, features and advantages of the present invention will be more clearly understood from the following detailed description taken in conjunction with the accompanying drawings described below.

DETAILED DESCRIPTION OF PREFERRED FORMS OF THE INVENTION

Figure 1:
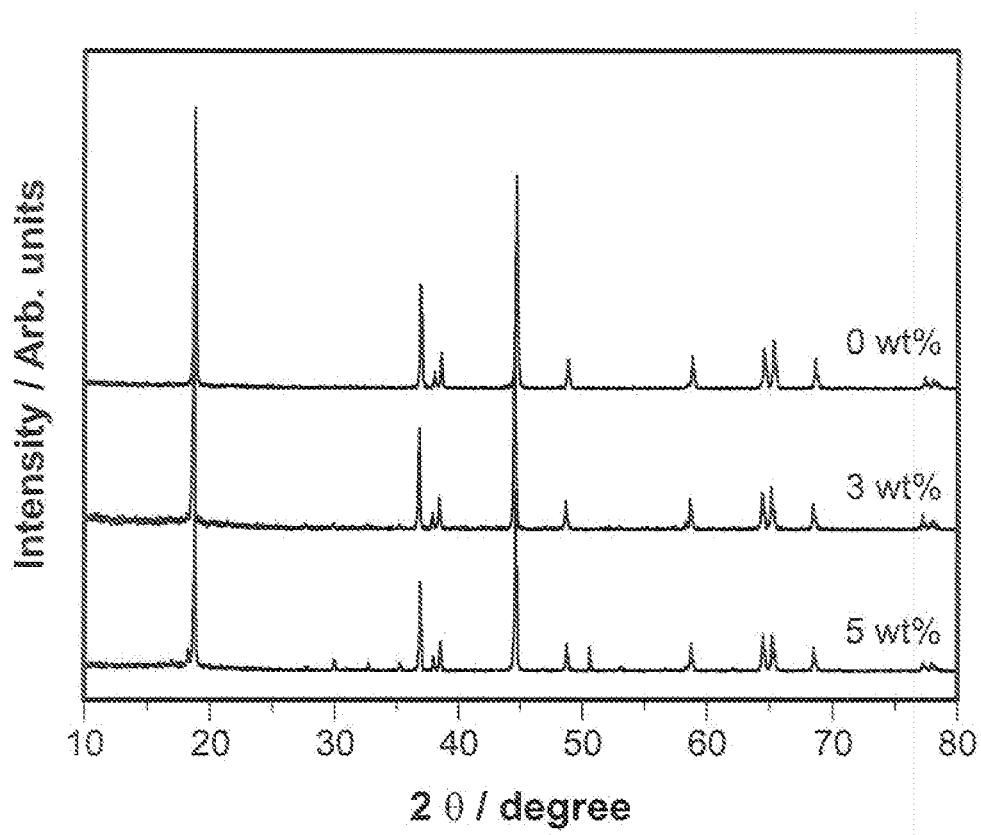
FIG. 1 shows an example of XRD (X-ray diffraction) patterns of various preferred materials of the invention.
Figure 2:
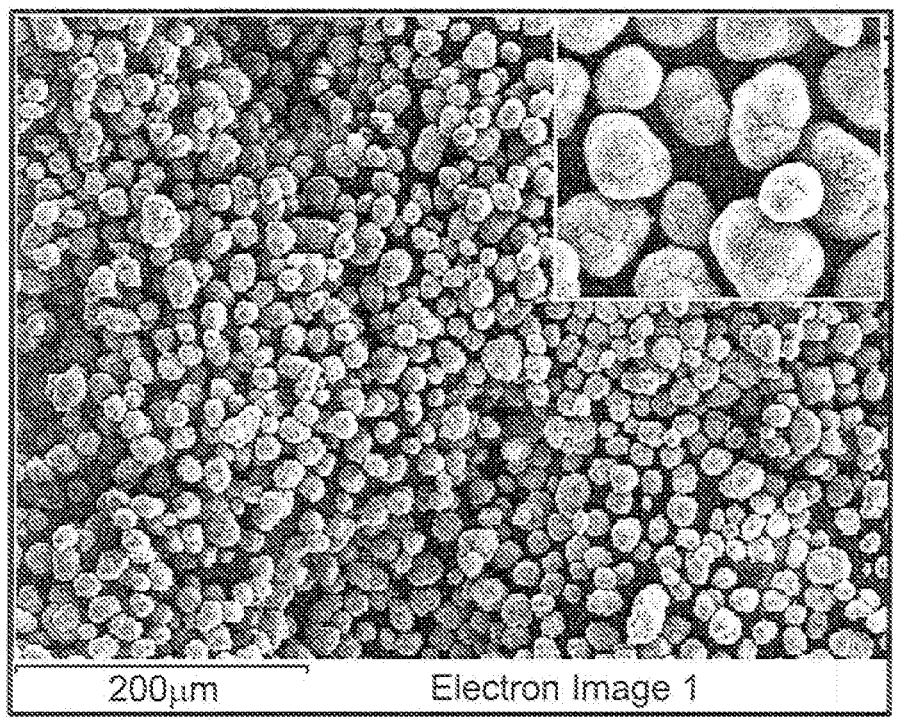
FIG. 2 shows an example of two levels of magnification of scanning electron microscopy (SEM) images of a lithium composite oxide, respectively, produced in accordance with one embodiment of the present invention.
Figure 3:
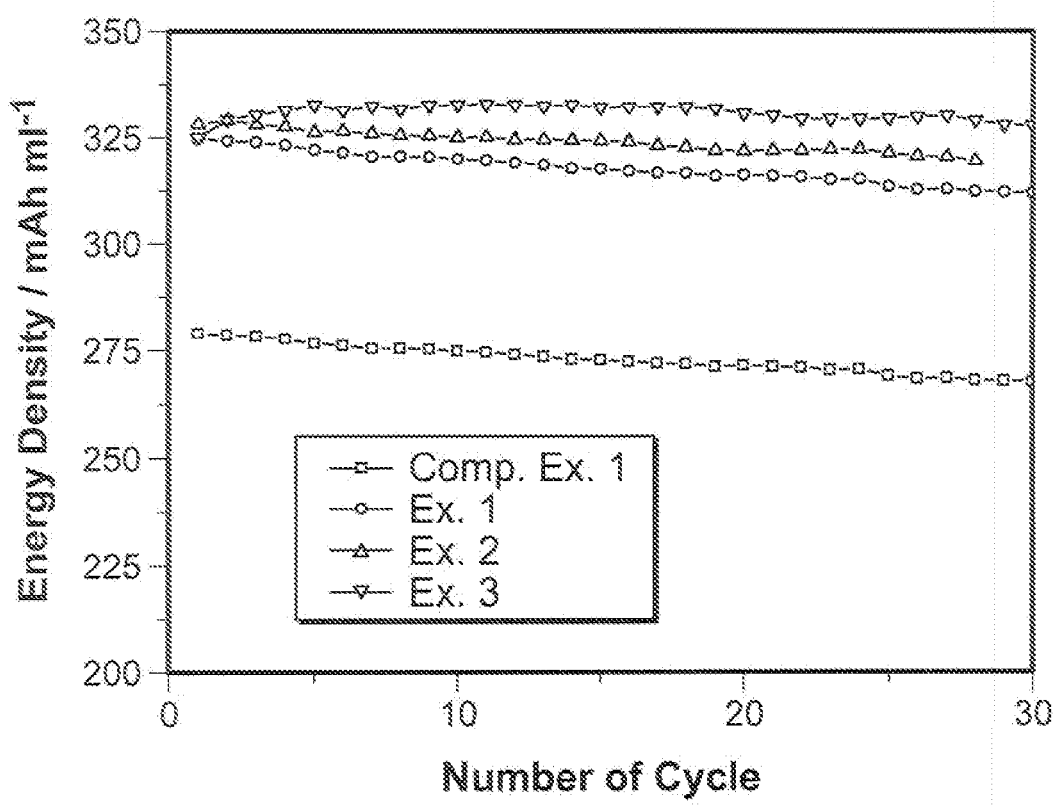
FIG. 3 shows energy density according to increasing number of cycles for Examples 1-3 compared to Comparison Example 1.
Figure 4:
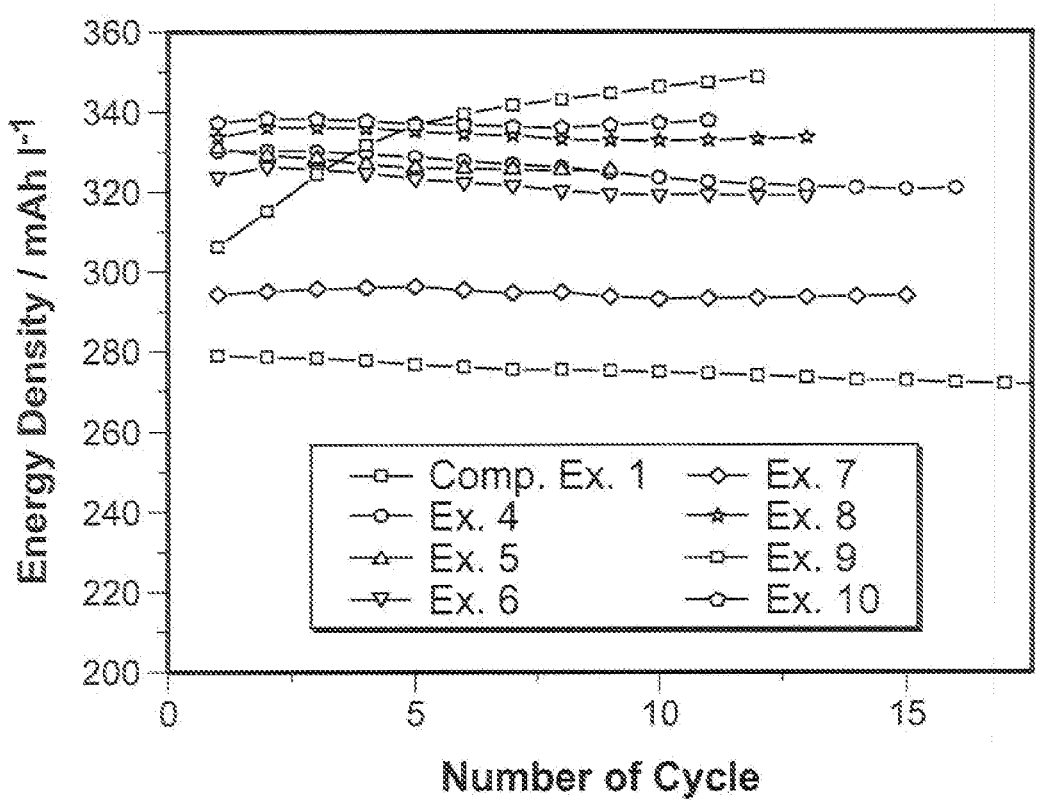
FIG. 4 shows energy density according to increasing number of cycles for Examples 4-10 compared to Comparison Example 1.
Figure 5:
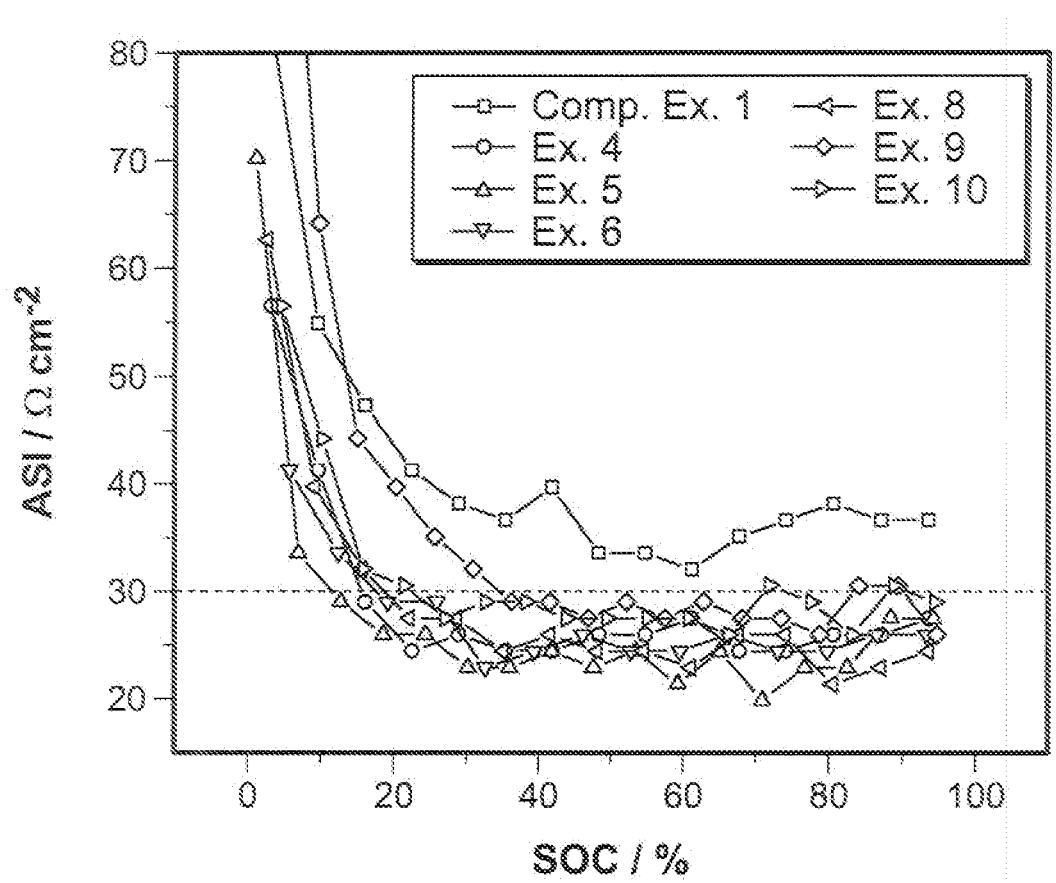
FIG. 5 shows area specific impedance (ASI) according to state of charge (SOC) for Examples 4-10 compared to Comparison Example 1.

The present invention relates to methods of preparation and an article of manufacture of a layered structure of Li—Ni—Co—Mn composite oxide. This material has secondary particles for the cathode materials with a spherical morphology and with a tap density of over 1.9 g/ml.

The cathode materials preferably include, for example, a layered structure of the Li—Ni—Co—Mn series, which includes at least compositions represented by:

$Li_{1+x}Ni_\alpha Co_\beta Mn_\gamma Mo_{\delta'}M_\kappa O_{2-z}X_z$ wherein M is Mg, Zn, Al, Ga, B, Zr, Si, Ti, Nb, or W and wherein X is F, S, Cl, I; x ranges from 0 to about 0.33; $\alpha'$, $\beta'$, and $\gamma'$ independently range from 0 to 1; $\delta'$ ranges from 0 to about 0.2, $\kappa$ ranges from about 0.01 to 0.15, and z ranges from 0 to about 0.3; and $Li_{1+x}Ni_\alpha Co_\beta Mn_\gamma Mo_{\delta'}M_\kappa O_{4-z}X_z$ wherein M is Mg, Zn, Al, Ga, B, Zr, Si, Ti, Nb, or W; X is F, S, Cl, I; x ranges from 0 to about 0.33; $\alpha'$, $\beta'$ and $\gamma'$ independently range from 0 to about 2; $\delta'$ ranges from 0 to about 0.2, $\kappa$ ranges front about 0.01 to 0.15 and z ranges from 0 to about 0.3.

In order to obtain a high tap density of the final cathode materials in excess of 2.2 g/ml, (Ni—Co—Mn)CO$_3$ precursor is precalcined at over 600° C., and then undergoes a simple blending with MoO$_3$. The mix is then re-heated and calcined at 900° C. in the air. No particular limitation is imposed on the sequence in time for adding the molybdenum constituent, such as before pre-calcination, after pre-calcination, or final calcination. Also, there is no limitation necessary for use of a composite transition metal source, such as, for example without limitation, composite transition metal hydroxide, composite transition metal carbonate, composite transition metal oxalates. Lithium sources are, for example, preferably lithium hydroxide, lithium carbonate, lithium acetate, or lithium nitrate. The molybdenum sources are, for example, preferably MoO$_3$, MoCl$_3$, and MoO$_2$.

In a most preferred embodiment, composite transition metal carbonate is suitable for the aforementioned starting precursor, which is readily changed to a carbonate, under 500° C. calcinations, and has a nano size of primary particles, which can easily react with a lithium source and the molybdenum.

Particle shape and size of the composite transition metal oxides are important to the rate capability and area specific impedance. Spherical particle morphology and particle sixe distribution are preferably about 1-50 microns in average diameter.

The amount of additive, for sintering are not particularly limited. However, in order to obtain high energy densities, the amount of added molybdenum is below about 15 wt % of the cathode materials. When the amount of additive is in excess of 15 wt %, the gravimetric capacity becomes low; and thus preferably the amount of additive is usually below 10 wt % of cathode materials and more preferably below 5 wt %.

The molybdenum composite oxide produced in accordance with the present invention can be used to manufacture lithium secondary batteries having a high tap density cathode material, and provides excellent capacity maintenance characteristics and cycle life characteristics. In addition, the molybdenum composite oxide can be used to manufacture lithium secondary batteries for HEV, EV, portable electronic devices, e.g., mobile communication equipment for information communication, digital cameras and camcorders.

The following non-limiting examples illustrate several preferred forms of the invention.

EXAMPLES

Example 1

Nickel-cobalt-manganese carbonate $(Ni_{1/3}Co_{1/3}Mn_{1/3}CO_3)$ is prepared by a carbonate co-precipitation method, as follows; An aqueous solution of NiSO$_4$, CoSO$_4$, and MnSO$_4$ (cationic ration of Ni:Co:Mn=1:1:1) with a concentration of 2.0 mol dm$^{-3}$ is pumped into a continuous stirred tank reactor (CSTR, capacity 4 L) under a CO$_2$ atmosphere. At the same time, Na$_2$CO$_3$ solution (aq.) of 2.0 mol dm$^{-3}$ and a desired amount of NH$_4$OH solution (aq.) are also separately fed into the reactor. The solution is maintained at 50° C. for 12 h while closely monitoring the concentration of the solution (2M), pH 7.5, temperature (50° C.), and stirring speed (1000 rpm) of the mixture. Then, the spherical $(Ni_{1/3}Co_{1/3}Mn_{1/3})CO_3$ powder formed is filtered, washed, and vacuum-dried at room temperature. Next the prepared spherical $(Ni_{1/3}Co_{1/3}Mn_{1/3})CO_3$ powder is dried at 100° C. to remove the adsorbed water. Next, the carbonate powder is fired at 600° C. for 5 hours to decompose the carbonate, and to obtain an intermediate composite oxide $(Ni_{1/3}Co_{1/3}Mn_{1/3})O_{2+y}$ as a precursor. The intermediate composite oxide $(Ni_{1/3}Co_{1/3}Mn_{1/3})O_{2+y}$ is simply mixed with lithium carbonate (Li$_2$CO$_3$) and molybdenum trioxide (MoO$_3$). The resultant mixture is heated from room temperature to 900° C. at a rate of 100° C./hr in air. The temperature is maintained for 20 hr, to thereby obtain the $Li(Ni_{1/3}Co_{1/3}Mn_{1/3})_{1-x}Mo_xO_2$ composite oxide. The average particle size of the final, powder is approximately 10 μm.

Powder X-ray diffraction (Rigaku, Rint-2000) employing Cu Kα radiation was used to identify the crystalline phase of the prepared powders at each stage. The prepared powders were also observed using scanning electron microscopy (SEM, JSM-6340F, JEOL). The obtained materials tap density (g/ml) was measured by a tap measurement machine with 1250 times of tapping.

Charge-discharge studies were performed with a coin type cell (CR2032) with a current density of 10 mA cm$^{-2}$ at room temperature. The cell consisted of a positive $Li[Ni_{1/3}Co_{1/3}Mn_{1/3}]_{1-x}Mo_xO_2$ electrode and a negative lithium metal electrode, separated by a porous polypropylene film. The positive electrode contained 84 wt % $Li[(Ni_{1/3}Co_{1/3}Mn_{1/3}]O_2$, 8% PVDF (polyvinylidene fluoride) binder, and 8% carbon acetylene black (Alfa Easer Co), which was coated on a Al foil. The electrolyte was a 1:2 blend of ethylene carbonate (EC) and dimethyl carbonate (DMC) containing 1M LiPF$_6$.

Example 2

The procedure of Example 1 was repeated, except that the added amounts of MoO$_3$ was 10 wt % (weight ratio was $Li(Ni_{1/3}Co_{1/3}Mn_{1/3})O_2:MoO_3=1:0.1$). The results of the evaluations are shown in Table 1.

TABLE 1

| No. | wt % of added $MoO_3$ | Calcination condition | Tap density g/ml | Lattice constant Å a | Lattice constant Å c | Capacity mAh/g initial | Capacity mAh/g 50th | Energy density mAh/ml |
|---|---|---|---|---|---|---|---|---|
| Ex. 1 | 5 | 900° C.-20 hr | 2.13 | 2.86 | 14.17 | 154 | 147 | 324 |
| Ex. 2 | 10 | 900° C.-20 hr | 2.32 | 2.86 | 14.20 | 142 | 137 | 328 |
| Ex. 3 | 15 | 900° C.-20 hr | 2.33 | 2.86 | 14.20 | 110 | 103 | 325 |
| Ex. 4 | 3 | 900° C.-0.5 hr | 2.13 | 2.86 | 14.17 | 154 | 142 | 328 |
| Ex. 5 | 5 | 900° C.-0.5 hr | 2.18 | 2.86 | 14.17 | 151 | 139 | 329 |
| Ex. 6 | 7 | 900° C.-0.5 hr | 2.23 | 2.86 | 14.18 | 145 | 134 | 323 |
| Ex. 7 | 10 | 900° C.-0.5 hr | 2.28 | 2.86 | 14.20 | 130 | 124 | 337 |
| Ex. 8 | 5 | 900° C.-0.5 hr | 2.25 | 2.86 | 14.17 | 148 | 141 | 333 |
| Ex. 9 | 5 | 900° C.-0.5 hr | 2.37 | 2.86 | 14.17 | 129 | 135 | 305 |
| Ex. 10 | 5 | 900° C.-0.5 hr | 2.27 | 2.86 | 14.20 | 148 | 143 | 335 |
| Ex. 11 | 0 | 900° C.-20 hr | 1.9 | 2.86 | 14.18 | 150 | 143 | 285 |
| Comp. Ex. 1 | 0 | 900° C.-20 hr | 1.7 | 2.86 | 14.17 | 165 | 155 | 280 |

Example 3

The procedure of Example 1 was repeated, except that added amounts of $MoO_3$ was 15 wt % (weight ratio was $Li(Ni_{1/3}Co_{1/3}Mn_{1/3})O_2:MoO_3=1:0.15$). The results of evaluations are shown in Table 1.

Example 4

The $Li(Ni_{1/3}Co_{1/3}Mn_{1/3})O_2$ composite oxide which had been synthesized in Example 1, except that $Li(Ni_{1/3}Co_{1/3}Mn_{1/3})O_2$ powder, obtained at 900° C. after 20 hr and then mixed with $MoO_3$, 3 wt %. The resultant mixture was heated from room temperature to 900° C. at a rate of 100° C./hr in air. The temperature was maintained for 30 min, to thereby obtain a $Li(Ni_{1/3}Co_{1/3}Mn_{1/3})_{1-x}Mo_xO_2$ composite oxide. The results of the evaluations are shown in Table 1.

Example 5

The procedure of Example 4 was repeated, except that added amounts of $MoO_3$ is 5 wt % (weight ratio was $Li(Ni_{1/3}Co_{1/3}Mn_{1/3})O_2:MoO_3=1:0.05$). The results of the evaluations are shown in Table 1.

Example 6

The procedure of Example 4 was repeated, except that added amounts of $MoO_3$ is 7 wt % (weight ratio was $Li(Ni_{1/3}Co_{1/3}Mn_{1/3}CO_3)O_2:MoO_3=1:0.07$). The results of evaluations are shown in Table 1.

Example 7

The procedure of Example 4 was repeated, except that added amounts of $MoO_3$ is 10 wt % (weight ratio was $Li(Ni_{1/3}Co_{1/3}Mn_{1/3})O_2:MoO_3=1:0.1$). The results of evaluations are shown in Table 1.

Example 8

The $Li(Ni_{1/3}Co_{1/3}Mn_{1/3})O_2$ composite oxide which had been synthesized in Example 1, except that $Li(Ni_{1/3}Co_{1/3}Mn_{1/3})O_2$ powder, obtained at 900° C. after 20 hr and then mixed with LiF 0.04 mol %, and 3 wt % $MoO_3$. The resultant mixture was heated from room temperature to 900° C., at a rate of 100° C./hr in air. The temperature was maintained for 30 min, to thereby obtain an $Li(Ni_{1/3}Co_{1/3}Mn_{1/3})_{1-x}Mo_xO_{1.96}F_{0.04}$ composite oxide. The results of evaluations are shown in Table 1.

Example 9

The $Li(Ni_{1/3}Co_{1/3}Mn_{1/3})_{1-x}Mo_xO_2$ composite oxide which had been synthesized in Example 1, except that $Li(Ni_{1/3}Co_{1/3}Mn_{1/3})_{1-x}Mo_xO_2$ precursor, obtained at 900° C. for 30 min and then mixed with $Li_2CO_3$. The resultant mixture was heated from room temperature to 900° C., at a rate of 100° C./hr in air. The temperature was maintained for 20 hr, to thereby obtain the $Li(Ni_{1/3}Co_{1/3}Mn_{1/3})_{1-x}Mo_xO_2$ composite oxide. The results of evaluations on the material are shown in Table 1.

Example 10

The $Li(Ni_{1/3}Co_{1/3}Mn_{1/3})O_2$ composite oxide which had been synthesized in Example 4, except that $Li(Ni_{1/3}Co_{1/3}Mn_{1/3})O_2$ powder, obtained at 700° C. after 20 hr and then mixed with 5 wt % $MoO_3$. The resultant mixture was then heated from room temperature to 900° C., at a rate of 100° C./hr in air. The temperature was maintained for 30 min, to thereby obtain the $Li(Ni_{1/3}Co_{1/3}Mn_{1/3})_{1-x}Mo_xO_2$ composite oxide. The results of the composite oxide evaluations are shown in Table 1.

Example 11

The $Li(Ni_{1/3}Co_{1/3}Mn_{1/3})O_{1.96}F_{0.04}$ composite oxide which had been synthesized in Example 1, by simple mixing with ($Ni_{1/3}Co_{1/3}Mn_{1/3})CO_3$, $Li_2CO_3$ and LiF sintering agents, except that no $MoO_3$ is added, $Li(Ni_{1/3}Co_{1/3}Mn_{1/3})O_{1.96}F_{0.04}$ powder were obtained at 900° C. after 20 hr. The results of evaluations are shown in Table 1. In this ease the tab density of the material was 1.9 m²/ml which is slightly higher than similar material made without LiF sintering agent. But much lower than the material prepared using both $MoO_3$ and the sintering agent.

Example 12

Comparative Example 1

The procedure of Example 1, was repeated, except that no $MoO_3$ was added. The results of composite's evaluation are shown in Table 1.

The present invention has been described herein with reference to the preferred embodiments and accompanying drawings. These embodiments and drawings do not serve to limit the invention, but are set forth for illustrative purposes. The scope of the invention is defined by the claims that follow. Those skilled in the art will appreciate that various modifications, additions and substitutions are possible, without departing from the scope and spirit of the invention as disclosed in the accompanying claims.

The invention claimed is:

1. An electrochemical device comprising a positive electrode of lithium molybdenum composite transition metal oxide, a negative electrode and a non-aqueous electrolyte wherein the positive electrode has a composition selected from the group consisting of $Li_{1+x}Ni_{\alpha'}Co_{\beta'}Mn_{\gamma'}Mo_{\delta'}M_kO_{2-z}X_z$, wherein M is selected from the group of Mg, Zn, Al, Ga, B, Zr, Si, Ti, Nb, or W and wherein X includes at least one of F, S, Cl, I; x ranges from about 0 to 0.33; $\alpha'$, $\beta'$, and $\gamma'$ independently range from about 0 to 1; $\delta'$ ranges from about 0 to 0.2, κ ranges from 0.01 to 0.15, and z ranges from about 0 to 0.3.

2. The electrochemical device of claim 1 wherein the positive electrode and the negative electrode are separated by a porous separator.

3. The electrochemical device of claim 1 comprising a positive active material with nano-sized plurality of particles with less than about 50 microns in average diameter.

4. The electrochemical device of claim 2 further including a positive active material with tap density in excess of 2.2 g/ml.

5. The electrochemical device of claim 1, wherein the non-aqueous electrolyte comprises an alkali metal salt and a polar aprotic solvent.

6. The electrochemical device of claim 5 wherein the alkali metal salt is a lithium salt.

7. The electrochemical device of claim 6 wherein the lithium salt is selected from the group consisting of $Li[(C_2C_4)_2B]$, $Li(C_2C_4)BF_2$, $Li[PF_2(C_2C_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, and mixtures thereof.

8. The electrochemical device of claim 1, wherein the polar aprotic solvent is selected from the group consisting of ethylene carbonate, propylene carbonate, dimethyl carbonate, diethyl carbonate, ethyl methyl carbonate, dimethyl ether, gamma-butyrolactone, and mixtures of any two or more thereof.

9. The electrochemical device of claim 1 wherein the positive electrode has a composition selected from the group consisting of $Li_{1+x}Ni_{\alpha'}Co_{\beta'}Mn_{\gamma'}Mo_{\delta'}M_kO_{4-z}X_z$, wherein M is selected from the group of Mg, Zn, Al, Ga, B, Zr, Si, Ti, Nb, or W and wherein X includes at least one of F, S, Cl, I; x ranges from about 0 to 0.33; $\alpha'$, $\beta'$, and $\gamma'$ independently range from about 0 to 2; 6' ranges from about 0 to 0.2, κ ranges from about 0.01 to 0.15, and z ranges from about 0 to 0.3.

10. The electrochemical device as defined in claim 1 wherein the positive electrode comprises secondary particles of a spherical morphology.

11. The electrochemical device as defined in claim 1 wherein the positive electrode comprises a plurality of layers.

12. The electrochemical device as defined in claim 9 wherein the positive electrode comprises a plurality of layers.

13. The electrochemical device as defined in claim 1 wherein the molybdenum is less than about 15 wt % of the positive electrode.

14. The electrochemical device as defined in claim 9 wherein the molybdenum is less than about 15 wt % of the positive electrode.

15. The electrochemical device as defined in claim 1 wherein the molybdenum comprises a phase related from the group of $MoO_3$, $MoCl_3$ and $MoO_2$ and mixtures thereof.

16. The electrochemical device as defined in claim 9 wherein the molybdenum comprises a phase related from the group of $MoO_3$, $MoCl_3$ and $MoO_2$ and mixtures thereof.

17. The electrochemical device as defined in claim 1 wherein the positive electrode comprises nano-size plurality of particles having a diameter between about 1-50 microns.

* * * * *